DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 30, 1970

875 O.G. 714

T875,028

SUPERSENSITIZED SILVER HALIDE PHOTOGRAPHIC MATERIALS

Cynthia G. Ulbing and Mary Jane W. Brizee, both % Research Laboratories, Kodak Park, Rochester, N.Y. 14650

Filed Dec. 12, 1969, Ser. No. 884,745
**Int. Cl. G03c *1/28***
U.S. Cl. 96—104
No Drawing. 17 Pages Specification

Photographic silver halide emulsions are spectrally sensitized with a dye combination comprising (1) a benzimidazolocarbocyanine dye and (2) a benzimidazolooxacarbocyanine dye having an alkoxy group in the 5- or 6-position of the benzoxazole nucleus. A preferred dye combination comprises (1) a benzimidazolocarbocyanine dye having the following formula:

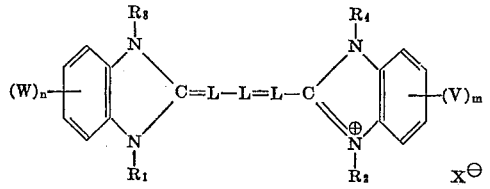

and (2) a benzimidazolooxacarbocyanine dye having the following formula:

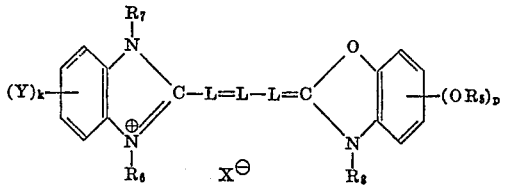

wherein each L represents a methine linkage; *n, m, k* and *p* each represents a positive integer of from 1 to 2; $R_1$, $R_2$, $R_6$ and $R_8$ each represents an alkyl group; $R_3$, $R_4$ and $R_7$ each represents an unsubstituted lower alkyl group; $R_5$ represents an unsubstituted lower alkyl group or an aryl group; X represents an acid anion; and, V, W and Y each represents a halogen atom. A typical highly useful emulsion comprises a silver bromoiodide emulsion containing the combination of anhydro-5,5′,6,6′-tetrachloro-1,1′-diethyl-3,3′-di(3-sulfobutyl)benzimidazolocarbocyanine hydroxide with anhydro-5,6-dichloro - 1,3′ - diethyl-5′-methoxy-(3-sulfopropyl)benzimidazolooxacarbocyanine hydroxide.